(12) United States Patent
Shimoharai et al.

(10) Patent No.: US 11,001,706 B2
(45) Date of Patent: *May 11, 2021

(54) POLYESTER RESIN COMPOSITION, AND LIGHT REFLECTOR COMPONENT AND LIGHT REFLECTOR INCLUDING POLYESTER RESIN COMPOSITION

(71) Applicant: TOYOBO CO., LTD., Osaka (JP)

(72) Inventors: Takuya Shimoharai, Otsu (JP); Satoru Horiguchi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/482,838

(22) PCT Filed: Jan. 26, 2018

(86) PCT No.: PCT/JP2018/002536
§ 371 (c)(1),
(2) Date: Aug. 1, 2019

(87) PCT Pub. No.: WO2018/143100
PCT Pub. Date: Aug. 9, 2018

(65) Prior Publication Data
US 2020/0010667 A1    Jan. 9, 2020

(30) Foreign Application Priority Data

Feb. 2, 2017 (JP) ............................. JP2017-017674

(51) Int. Cl.
| | | |
|---|---|---|
| C08L 67/02 | (2006.01) | |
| C08L 25/12 | (2006.01) | |
| C08K 5/098 | (2006.01) | |
| C08G 63/183 | (2006.01) | |
| G02B 5/08 | (2006.01) | |

(52) U.S. Cl.
CPC ............ *C08L 67/02* (2013.01); *C08G 63/183* (2013.01); *C08K 5/098* (2013.01); *C08L 25/12* (2013.01); *G02B 5/0866* (2013.01); *C08L 2205/03* (2013.01)

(58) Field of Classification Search
CPC ...... C08L 67/02; C08L 25/12; C08L 2205/03; C08G 63/183; C08K 5/098; G02B 5/0866
USPC ........................................................ 525/444
See application file for complete search history.

(56) References Cited

U.S. PATENT DOCUMENTS

| | | | |
|---|---|---|---|
| 5,981,628 | A | 11/1999 | Takamoto et al. |
| 6,579,609 | B1 | 6/2003 | Talibuddin |
| 10,385,205 | B2 | 8/2019 | Shimoharai et al. |
| 10,550,262 | B2 | 2/2020 | Shimoharai et al. |
| 2002/0075686 | A1 | 6/2002 | Kosugi et al. |
| 2003/0096122 | A1 | 5/2003 | Mercx et al. |
| 2006/0142438 | A1 | 6/2006 | Ishii et al. |
| 2006/0270824 | A1 | 11/2006 | Leemans et al. |
| 2006/0291215 | A1 | 12/2006 | Shirai et al. |
| 2007/0185257 | A1 | 8/2007 | Wursche et al. |
| 2007/0254150 | A1 | 11/2007 | Seino et al. |
| 2007/0265382 | A1 | 11/2007 | Yamamoto |
| 2007/0275242 | A1 | 11/2007 | Gopal et al. |
| 2007/0282056 | A1 | 12/2007 | Schellekens et al. |
| 2008/0064824 | A1 | 3/2008 | Suzuki et al. |
| 2008/0161468 | A1 | 7/2008 | Juikar et al. |
| 2008/0167410 | A1 | 7/2008 | Shim et al. |
| 2008/0246191 | A1 | 10/2008 | Agarwal et al. |
| 2009/0264611 | A1 | 10/2009 | Hamano et al. |
| 2009/0318588 | A1 | 12/2009 | Kim et al. |
| 2010/0309571 | A1 | 12/2010 | Watari et al. |
| 2011/0004983 | A1 | 1/2011 | Yagura et al. |
| 2013/0112271 | A1 | 5/2013 | Ikehata et al. |
| 2013/0131255 | A1 | 5/2013 | Pottie et al. |
| 2013/0253145 | A1 | 9/2013 | Sakai et al. |
| 2014/0127441 | A1 | 5/2014 | Nakamura et al. |
| 2014/0296386 | A1 | 10/2014 | Maeda et al. |
| 2015/0068601 | A1 | 3/2015 | Ikehata et al. |

(Continued)

FOREIGN PATENT DOCUMENTS

| | | |
|---|---|---|
| CN | 1753930 | 3/2006 |
| CN | 101372550 | 2/2009 |

(Continued)

OTHER PUBLICATIONS

WO 2017/038581 A1, machine translation, InnovationQ Plus (IP. com). (Year: 2017).*
International Search Report dated Apr. 24, 2018 in International (PCT) Application No. PCT/JP2018/002535.
International Search Report dated Apr. 24, 2018 in International (PCT) Application No. PCT/JP2018/002536.
International Search Report dated Mar. 14, 2017 in International Application No. PCT/JP2016/088199.
International Search Report dated Oct. 25, 2016 in International Application No. PCT/JP2016/074663.
Journal of Zhejiang University (Science Edition) vol. 29, No. 1, Jan. 2002, pp. 67-72.
International Search Report dated Oct. 25, 2016 in International Application No. PCT/JP2016/074662.

(Continued)

*Primary Examiner* — Josephine L Chang
(74) *Attorney, Agent, or Firm* — Wenderoth, Lind & Ponack, L.L.P.

(57) ABSTRACT

A polyester resin composition contains a polyester resin A containing 70 to 100 mass % of a polybutylene terephthalate resin and 0 to 30 mass % of a polyethylene terephthalate resin. The polyester resin composition further contains a metal organic acid salt B, which is either or both of an alkali metal organic acid salt and an alkaline earth metal organic acid salt, and a predetermined amount of a styrenic resin C. The polyester resin composition contains a predetermined amount of either or both of an alkali metal atom and an alkaline earth metal atom relative to 100 parts by mass of the polyester resin A. In the polyester resin composition, the amount of linear oligomers of polybutylene terephthalate or the amount of the linear oligomers of polybutylene terephthalate and linear oligomers of polyethylene terephthalate is less than or equal to 1000 mg/kg.

8 Claims, No Drawings

(56) References Cited

U.S. PATENT DOCUMENTS

| | | |
|---|---|---|
| 2015/0087034 A1 | 3/2015 | Utsunomiya et al. |
| 2015/0368459 A1 | 12/2015 | Yamanaka et al. |
| 2017/0190906 A1 | 7/2017 | Mutou |
| 2018/0126714 A1 | 5/2018 | Motoshiromizu et al. |
| 2018/0282538 A1 | 10/2018 | Shimoharai et al. |
| 2018/0282539 A1 | 10/2018 | Yasui et al. |
| 2018/0319975 A1 | 11/2018 | Shimoharai et al. |
| 2019/0002687 A1 | 1/2019 | Shimoharai et al. |
| 2020/0231801 A1 | 7/2020 | Shimoharai et al. |

FOREIGN PATENT DOCUMENTS

| | | |
|---|---|---|
| CN | 101410442 | 4/2009 |
| CN | 101428478 | 5/2009 |
| CN | 101501133 | 8/2009 |
| CN | 101679728 | 3/2010 |
| CN | 103237844 | 8/2013 |
| CN | 104672797 | 6/2015 |
| CN | 104861587 | 8/2015 |
| CN | 104918997 | 9/2015 |
| CN | 108026358 | 5/2018 |
| CN | 108473753 | 8/2018 |
| DE | 10 2009 020 211 | 11/2010 |
| EP | 3 327 085 | 5/2018 |
| JP | 06-9858 | 1/1994 |
| JP | 07-062116 | 3/1995 |
| JP | 10-030054 | 2/1998 |
| JP | 2001-089590 | 4/2001 |
| JP | 2002-121273 | 4/2002 |
| JP | 2003-026905 | 1/2003 |
| JP | 2004-075867 | 3/2004 |
| JP | 2004-175889 | 6/2004 |
| JP | 2004-323837 | 11/2004 |
| JP | 2006-117768 | 5/2006 |
| JP | 2006-176711 | 7/2006 |
| JP | 2007-146047 | 6/2007 |
| JP | 2007-161840 | 6/2007 |
| JP | 2008-280498 | 11/2008 |
| JP | 2008-291238 | 12/2008 |
| JP | 2009-102581 | 5/2009 |
| JP | 2009-227749 | 10/2009 |
| JP | 2009-235156 | 10/2009 |
| JP | 2009-292897 | 12/2009 |
| JP | 2010-155900 | 7/2010 |
| JP | 2010-189584 | 9/2010 |
| JP | 2013-159732 | 8/2013 |
| JP | 5284557 | 9/2013 |
| JP | 5292877 | 9/2013 |
| JP | 2014-028883 | 2/2014 |
| JP | 2014-210850 | 11/2014 |
| JP | 5864021 | 2/2016 |
| JP | 5895567 | 3/2016 |
| JP | 2017-036442 | 2/2017 |
| JP | 2017-048374 | 3/2017 |
| JP | 6119936 | 4/2017 |
| JP | 61-97975 | 9/2017 |
| WO | 00/11071 | 3/2000 |
| WO | 2005/121254 | 12/2005 |
| WO | 2008/133262 | 11/2008 |
| WO | 2011/148992 | 12/2011 |
| WO | 2012/147871 | 11/2012 |
| WO | 2013/005823 | 1/2013 |
| WO | 2013/072310 | 5/2013 |
| WO | 2013/146281 | 10/2013 |
| WO | 2016/117586 | 7/2016 |
| WO | 2016/167084 | 10/2016 |
| WO | 2017/014239 | 1/2017 |
| WO | 2017/038581 | 3/2017 |
| WO | 2017/110917 | 6/2017 |
| WO | 2018/143077 | 8/2018 |
| WO | 2018/143100 | 8/2018 |

OTHER PUBLICATIONS

International Search Report dated Jun. 18, 2019 in International (PCT) Application No. PCT/JP2019/012393.

U.S. Appl. No. 16/982,256, filed Sep. 18, 2020, entitled "Polyester Resin Composition, Light-Reflector Component Containing Same, and Light Reflector".

Notice of Grounds of Rejection dated Jul. 30, 2019 in Japanese Patent Application No. 2018-510892 with English translation (previously submitted in IDS dated Nov. 6, 2019).

Notice of Grounds of Rejection dated May 9, 2017 in Japanese patent application No. 2017-511791, with English translation (previously submitted in IDS dated Nov. 6, 2019).

Office Action dated Jun. 27, 2019 in Chinese Patent Application No. 201680051102.3, with English translation (previously submitted in IDS dated Nov. 6, 2019).

Office Action dated Aug. 8, 2019, in U.S. Appl. No. 15/756,761 (previously submitted in IDS dated Nov. 6, 2019).

Office Action dated Jan. 24, 2019, in U.S. Appl. No. 15/756,749 (previously submitted in IDS dated Nov. 6, 2019).

Office Action dated Jun. 16, 2020, in U.S. Appl. No. 16/064,583 (previously submitted in IDS dated Jul. 1, 2020).

Office Action dated Jan. 27, 2020, in U.S. Appl. No. 15/756,761 (previously submitted in IDS dated Feb. 12, 2020).

Office Action dated Dec. 3, 2019, in corresponding Chinese Patent Application No. 201680075670.7, with English translation (previously submitted in IDS dated Feb. 12, 2020).

Office Action dated Feb. 19, 2020, in U.S. Appl. No. 16/064,583 (previously submitted in IDS dated Feb. 27, 2020).

Office Action dated Aug. 7, 2019, in corresponding Chinese Patent Application No. 201680051143.2, with English translation (previously submitted in IDS dated Oct. 30, 2019).

Office Action dated Jul. 10, 2020, in U.S. Appl. No. 15/756,761 (previously submitted in IDS dated Jul. 22, 2020).

Notice of Grounds of Rejection dated Jul. 30, 2019 in Japanese Patent Application No. 2018-510893 with English translation (previously submitted in IDS dated Nov. 6, 2019).

Office Action dated Dec. 22, 2020, in corresponding Chinese Patent Application No. 201880009861.2, with English translation.

Office Action dated Feb. 3, 2021, in corresponding Chinese Patent Application No. 201880009854.2, with English translation.

\* cited by examiner

POLYESTER RESIN COMPOSITION, AND LIGHT REFLECTOR COMPONENT AND LIGHT REFLECTOR INCLUDING POLYESTER RESIN COMPOSITION

TECHNICAL FIELD

The present invention relates to a polyester resin composition, and a light reflector component including the polyester resin composition, and a light reflector including the polyester resin composition.

BACKGROUND ART

Polybutylene terephthalate resin has good properties in terms of, for example, injection moldability, mechanical properties, heat resistance, electrical properties, and chemical resistance, and is widely used for injection-molded products in the fields of automotive components, mechanical components, electrical components, and communication components. Polybutylene terephthalate resin also has good mold transferability and is thus used for lamp members especially for automotive extensions and the like which require a good appearance.

However, it is known that, in continuous molding of polybutylene terephthalate resin, various gases (hereinafter also referred to as "outgases") are generated during molding and, moreover, polybutylene terephthalate oligomers adhere to a mold and remain to cause residues on mold. The residues on mold may impair the appearance of molded products. It is thus necessary to frequently clean the mold during continuous molding when polybutylene terephthalate resin known in the art is used to form, for example, automotive lamps which require, for example, a high-brightness appearance (smoothness) and uniform reflectivity, components in other light fixtures and the like, and light reflector components having a light reflective layer on the surfaces. Since cleaning the mold requires temporary interruption of production, cleaning adversely affects productivity. Accordingly, there is a need for a polybutylene terephthalate resin that can reduce residues on mold.

CITATION LIST

Patent Literature

PTL 1: Japanese Patent Laying-Open No. 2014-028883
PTL 2: Japanese Patent Laying-Open No. 2004-323837

SUMMARY OF INVENTION

Technical Problem

For example, Japanese Patent Laying-Open No. 2014-028883 (PTL 1) proposes a method for deactivating a catalyst by using phenylsulfonic acid as a method for reducing generation of the outgases. The outgas reducing effect is confirmed. However, there is no mention about reduction of oligomers of polybutylene terephthalate resin and, therefore, there is room for an improvement in reducing residues on mold. Japanese Patent Laying-Open No. 2004-323837 (PTL 2) describes reduction of cyclic oligomers, such as cyclic dimers and cyclic trimers, but does not describe linear oligomers such as mentioned below. This technique is inadequate to reduce residues on mold.

In many cases, these types of molded products require, in addition to a low-gas property, a low-bleed-out property, which is obtained by reducing bleed-out in which polyester resin-derived oligomer components and release agent components float up to the surfaces of molded products.

The inventors of the present invention have diligently studied in order to reduce residues on mold during continuous molding. As a result, it is found that the basic causes of accumulation of residues on mold during continuous molding are not cyclic oligomers, such as cyclic dimers and cyclic trimers, which have been believed so far, but linear oligomers, achieving the present invention. It is also found that the effect of reducing residues on mold is exerted by obtaining a low-gas property for reducing an outgas generated during molding, completing the present invention, Moreover, the low-bleed-out property is successfully improved while the low-gas property is maintained.

Specifically, the present invention is directed to a polyester resin composition that has a low-gas property, can significantly reduce residues on mold during continuous molding, and exhibits a low-bleed-out property, and a light reflector component including the polyester resin composition, and a light reflector including the polyester resin composition.

Solution to Problem

According to the studies that have been carried out by the inventors of the present invention, the residues on mold during continuous molding can be significantly reduced by providing a polyester resin composition containing a polyester resin, an alkali metal organic acid salt, and the like, where the amount of polyester resin-derived linear oligomers in the polyester resin composition is less than or equal to 1000 mg/kg.

The polyester resin composition has an improved low-gas property but still has room for an improvement in low-bleed-out property in order to obtain a good appearance. In other words, the inventors of the present invention have studied in order to reduce whitening of molded products or observation of rainbow patterns, which is caused by bleed-out generated as a result of heat application after molding, thereby achieving the present invention.

Specifically, the present invention is as described below.
[1] A polyester resin composition containing a polyester resin A containing 70 to 100 mass % of a polybutylene terephthalate resin and 0 to 30 mass % of a polyethylene terephthalate resin, wherein the polyester resin composition further contains a metal organic acid salt B, which is either or both of an alkali metal organic acid salt and an alkaline earth metal organic acid salt, and 0.5 to 10 parts by mass of a styrenic resin C relative to 100 parts by mass of the polyester resin A; the polyester resin composition contains 0.000005 to 0.05 parts by mass of either or both of an alkali metal atom and an alkaline earth metal atom relative to 100 parts by mass of the polyester resin A; and, in the polyester resin composition, an amount of linear oligomers of polybutylene terephthalate or an amount of the linear oligomers of polybutylene terephthalate and linear oligomers of polyethylene terephthalate is less than or equal to 1000 mg/kg.
[2] The polyester resin composition according to [1], wherein the polyester resin composition contains 0.0005 to 0.05 parts by mass of either or both of the alkali metal atom and the alkaline earth metal atom relative to 100 parts by mass of the polyester resin A.
[3] The polyester resin composition according to [1] or [2], wherein the polyester resin composition contains a titanium atom in an amount less than or equal to 50 mg/kg.

[4] The polyester resin composition according to any one of [1] to [3], wherein the styrenic resin C is a styrene-acrylonitrile-based copolymer.
[5] The polyester resin composition according to any one of [1] to [4], wherein the metal organic acid salt B has one or two or more metal species selected from the group consisting of lithium, sodium, potassium, calcium, and magnesium.
[6] The polyester resin composition according to any one of [1] to [5], wherein the metal organic acid salt B is one or two or more selected from the group consisting of lithium acetate, sodium acetate, potassium acetate, calcium acetate, magnesium acetate, lithium benzoate, sodium benzoate, and potassium benzoate.
[7] A light reflector component containing the polyester resin composition according to any one of [1] to [6].
[8] A light reflector including the light reflector component according to [7], wherein the light reflector component has a light reflecting metal layer on at least part of a surface of the light reflector component.

Advantageous Effects of Invention

The present invention can provide a polyester resin composition that has a low-gas property, can significantly reduce residues on mold during continuous molding, and exhibits a low-bleed-out property.

DESCRIPTION OF EMBODIMENTS

The present invention will be described below in detail.
[Polyester Resin Composition]
The present invention is directed to a polyester resin composition containing a polyester resin A containing 70 to 100 mass % (greater than or equal to 70 mass % and less than or equal to 100 mass %, when the numerical value range is expressed by using "to" in this specification, the range is inclusive of the upper limit and the lower limit) of a polybutylene terephthalate resin, and 0 to 30 mass % of a polyethylene terephthalate resin. The polyester resin composition contains a metal organic acid salt B, which is either or both of an alkali metal organic acid salt and an alkaline earth metal organic acid salt, and 0.5 to 10 parts by mass of a styrenic resin C relative to 100 parts by mass of polyester resin A. The polyester resin composition further contains 0.000005 to 0.05 parts by mass of either or both of an alkali metal atom and an alkaline earth metal atom relative to 100 parts by mass of polyester resin A. In the polyester resin composition, the amount of linear oligomers of polybutylene terephthalate or the amount of the linear oligomers of polybutylene terephthalate and linear oligomers of polyethylene terephthalate is less than or equal to 1000 mg/kg.

The presence of metal organic acid salt B in the polyester resin composition according to the present invention can reduce generation of an outgas [e.g., tetrahydrofuran (hereinafter also referred to as "THF")] during molding, reduce transfer of cyclic oligomers and linear oligomers in the composition to a mold through THF and adhesion of the cyclic oligomers and linear oligomers to the mold, and reduce residues on mold based on these oligomers. The presence of styrenic resin C can reduce the bleed-out phenomenon in which polyester resin-derived oligomer components and release agent components float up to the surfaces of molded products due to heat application after molding.

Furthermore, the polyester resin composition can contain a release agent D described below and may contain an inorganic filler in order to improve heat resistance and rigidity. The polyester resin composition can further contain various additives as necessary unless the advantageous effects of the present invention are impaired. Examples of the additives include modifiers, heat stabilizers, antioxidants, ultraviolet absorbers, light stabilizers, plasticizers, denaturing agents, antistatic agents, flame retardants, dyes, and pigments. In the polyester resin composition of the present invention, the total amount of polyester resin A, metal organic acid salt B, styrenic resin C, and release agent D (the addition of release agent D is optional) is preferably greater than or equal to 85 mass %, more preferably greater than or equal to 90 mass %, and still more preferably greater than or equal to 95 mass %.

The polyester resin composition according to the present invention has a low-gas property and can significantly reduce residues on mold during continuous molding. Thus, the polyester resin composition according to the present invention can be effectively used especially for, for example, automotive lamps, components in other light fixtures and the like, and light reflector components having a light reflective layer on the surfaces.

<Polyester Resin A>

In the present invention, polyester resin A contains 70 to 100 mass % of a polybutylene terephthalate resin and 0 to 30 mass % of a polyethylene terephthalate resin. Polyester resin A is preferably composed of these two components, without excluding a possibility that polyester resin A contains a third component other than the polybutylene terephthalate resin and the polyethylene terephthalate resin. The amount of polyester resin A in the polyester resin composition is not limited as long as polyester resin A is a main component. The amount of polyester resin A in the polyester resin composition is preferably greater than or equal to 90 mass % and more preferably greater than or equal to 92 mass %.

(Polybutylene Terephthalate Resin)

The polybutylene terephthalate resin is a polymer that can be obtained by, for example, a typical polymerization method including the polycondensation reaction of a dicarboxylic acid mainly composed of terephthalic acid or an ester-forming derivative thereof and a diol mainly composed of 1,4-butanediol or an ester-forming derivative thereof. The butylene terephthalate repeating unit in the polybutylene terephthalate resin is preferably greater than or equal to 80 mol %, more preferably greater than or equal to 90 mol %, still more preferably greater than or equal to 95 mol %, and most preferably 100 mol %.

The polybutylene terephthalate resin can contain, for example, about 20 mass % or less of other polymerization component unless the properties of the polybutylene terephthalate resin are impaired. Examples of the polybutylene terephthalate resin containing other polymerization component include polybutylene (terephthalate/isophthalate), polybutylene (terephthalate/adipate), polybutylene (terephthalate/sebacate), polybutylene (terephthalate/decane dicarboxylate), polybutylene (terephthalate/naphthalate), and poly(butylene/ethylene) terephthalate. These components may be used alone or in combination of two or more.

The intrinsic viscosity (IV) of the polybutylene terephthalate resin is preferably 0.3 to 1.6 dl/g, more preferably 0.45 to 1.35 dl/g, still more preferably 0.5 to 1.2 dl/g, and yet still more preferably 0.55 to 1.05 dl/g. When the intrinsic viscosity (IV) of the polybutylene terephthalate resin is 0.3 to 1.6 dl/g, the polyester resin composition of the present invention has good mechanical properties and moldability. The intrinsic viscosity (IV) is determined by measuring the flow time (seconds) of a 0.4 g/dl solution of polybutylene terephthalate resin in a solvent mixture of phenol/tetrachloroethane (mass ratio: 1/1) and the flow time (seconds) of only the solvent mixture at 30° C. with an Ubbelohde viscometer. The intrinsic viscosity (IV) is obtained from the following formula (I) based on ASTM D4603.

$$\text{Intrinsic viscosity(IV)} = 0.25(\eta_r - 1 + 3 \ln \eta_r)/C \quad (I)$$

In the formula (I), $\eta_r = \eta/\eta_0$, $\eta$ is the flow time (seconds) of the polybutylene terephthalate resin solution, $\eta_0$ is the flow time (seconds) of only the solvent mixture, and C is the concentration (g/dl) of the polybutylene terephthalate resin solution.

Since the terminal carboxyl group of the polybutylene terephthalate resin plays a catalytic role in the polymer hydrolysis reaction, the hydrolysis is accelerated with increasing amount of the terminal carboxyl group. Thus, the concentration of the terminal carboxyl group is preferably low. The concentration of the terminal carboxyl group of the polybutylene terephthalate resin is preferably less than or equal to 40 eq/ton, more preferably less than or equal to 30 eq/ton, still more preferably less than or equal to 25 eq/ton, and yet still more preferably less than or equal to 20 eq/ton.

The concentration (unit: eq/ton) of the terminal carboxyl group of the polybutylene terephthalate resin is determined by, for example, dissolving a predetermined amount of the polybutylene terephthalate resin in benzyl alcohol and performing titration using a 0.01 mol/l solution of sodium hydroxide in benzyl alcohol. For example, a phenolphthalein solution may be used as an indicator.

Since the terminal hydroxyl groups of the polybutylene terephthalate resin cause back-biting mainly during melting, the terminal hydroxyl groups serve as starting points for generating THF, which is one of outgases, linear oligomers, and cyclic oligomers during molding. To reduce residues on mold, the concentration of the terminal hydroxyl groups is preferably lowered to reduce back-biting during molding. The concentration of the terminal hydroxyl groups of the polybutylene terephthalate resin is preferably less than or equal to 110 eq/ton, more preferably less than or equal to 90 eq/ton, still more preferably less than or equal to 70 eq/ton, and yet still more preferably less than or equal to 50 eq/ton.

The concentration (unit: eq/ton) of the terminal hydroxyl groups of the polybutylene terephthalate resin can be, for example, calculated from the peak value of terephthalic acid derived from polybutylene terephthalate and the peak value of 1,4-butanediol at the terminal on the basis of the spectrum obtained by $^1$H-NMR spectroscopy in accordance with a predetermined calculation.

(Polybutylene Terephthalate Resin)

The polyethylene terephthalate resin is a polymer that can be obtained by, for example, a typical polymerization method including the polycondensation reaction of a dicarboxylic acid mainly composed of terephthalic acid or an ester-forming derivative thereof and a diol mainly composed of ethylene glycol or an ester-forming derivative thereof. The repeating unit of ethylene terephthalate in the polyethylene terephthalate resin is preferably greater than or equal to 80 mol %, more preferably greater than or equal to 90 mol %, still more preferably greater than or equal to 95 mol %, and yet still more preferably 100 mol %.

The polyethylene terephthalate resin can contain, for example, about 20 mass % or less of other polymerization component unless the properties of the polyethylene terephthalate resin are impaired. Examples of the polyethylene terephthalate resin containing other polymerization component include polyethylene (terephthalate/isophthalate), polyethylene (terephthalate/adipate), polyethylene (terephthalate/sebacate), polyethylene (terephthalate/decane dicarboxylate), polyethylene (terephthalate/naphthalate), poly(ethylene/cyclohexane dimethyl) terephthalate, and poly(butylene/ethylene) terephthalate. These components may be used alone or in combination of two or more. In the present invention, the molding shrinkage of the polyester resin composition can be controlled by using such a polyethylene terephthalate resin.

The intrinsic viscosity (IV) of the polyethylene terephthalate resin is preferably 0.36 to 1.6 dl/g, more preferably 0.45 to 1.35 dl/g, still more preferably 0.5 to 1.2 dl/g, and yet still more preferably 0.55 to 1.05 dl/g. When the intrinsic viscosity (IV) of the polyethylene terephthalate resin is 0.36 to 1.6 dl/g, the polyester resin composition of the present invention has good mechanical properties and moldability. The intrinsic viscosity (IV) is determined by using the same method as the method for determining the intrinsic viscosity (IV) of the polybutylene terephthalate resin.

In the present invention, polyester resin A contains 70 to 100 mass % of a polybutylene terephthalate resin and 0 to 30 mass % of a polyethylene terephthalate resin. Polyester resin A preferably contains 80 to 100 mass % of the polybutylene terephthalate resin and 0 to 20 mass % of the polyethylene terephthalate resin, and more preferably contains 90 to 100 mass % of the polybutylene terephthalate resin and 0 to 10 mass % of the polyethylene terephthalate resin. As described above, the molding shrinkage of the polyester resin composition can be controlled by adding the polyethylene terephthalate resin. However, the presence of greater than 30 mass % of the polyethylene terephthalate resin degrades releasability in injection molding and reduces the heat resistance of the polyester resin composition, which is not preferred.

The total amount of the polybutylene terephthalate resin and the polyethylene terephthalate resin in polyester resin A is preferably greater than or equal to 80 mass %, more preferably greater than or equal to 90 mass %, and still more preferably greater than or equal to 95 mass %. The total amount of the polybutylene terephthalate resin and the polyethylene terephthalate resin may be 100 mass %.

(Titanium Catalyst)

The polybutylene terephthalate resin in the present invention can be obtained, for example, by the esterification reaction or transesterification reaction of 1,4-butanediol and terephthalic acid or dialkyl terephthalate using a titanium catalyst. In this case, the amount of titanium atoms in the polyester resin composition of the present invention is preferably less than or equal to 50 mg/kg to avoid decomposition of the polyester resin composition due to residence in the cylinder during molding. In other words, the amount of the titanium catalyst in the polyester resin composition in the present invention is defined by the amount of titanium atoms. The amount of titanium atoms is more preferably less than or equal to 45 mg/kg, still more preferably less than or equal to 40 mg/kg, and yet still more preferably less than or equal to 35 mg/kg. The lower limit of the amount of titanium atoms is preferably 5 mg/kg, more preferably 8 mg/kg, and still more preferably 15 mg/kg. If the amount of titanium atoms is greater than 50 mg/kg, it is difficult to exert the effect of reducing residues on mold.

The amount of titanium atoms can be determined by using a method, such as atomic emission, atomic absorption, or inductively coupled plasma (ICP), after the metal in the polymer is recovered by, for example a wet ashing method.

A well-known titanium compound can be used as a titanium catalyst. Specific examples include tetra-alkyl titanates including titanium alkoxides, such as tetra-ethyl titanate, tetra-isopropyl titanate, tetra-n-propyl titanate, and tetra-n-butyl titanate, and partial hydrolysates and titanium chelate compounds thereof; titanium acetate; titanyl oxalate compounds, such as titanyl oxalate, ammonium titanyl oxalate, sodium titanyl oxalate, potassium titanyl oxalate, calcium titanyl oxalate, and strontium titanyl oxalate; titanium trimellitate; titanium sulfate; titanium chloride; hydrolysates of titanium halides; titanium bromide; titanium fluoride; potassium titanate hexafluoride; ammonium titanate hexafluoride; cobalt titanate hexafluoride; manganese titanate hexafluoride; titanium acetylacetonate; a titanium complex with a hydroxy polycarboxylic acid or a nitrogen-containing polycarboxylic acid; a composite oxide composed of titanium and silicon or zirconium; a reaction product of a titanium alkoxide and a phosphorus compound; and a reaction product of a titanium alkoxide, an aromatic polyvalent carboxylic acid or an acid anhydride thereof, and a given phosphorus compound.

To reduce residues on mold, the titanium catalyst is preferably selected from the group consisting of tetra-alkyl titanates including titanium alkoxides, such as tetra-ethyl titanate, tetra-isopropyl titanate, tetra-n-propyl titanate, and tetra-n-butyl titanate, and partial hydrolysates and titanium chelate compounds thereof. The titanium catalyst is more preferably selected from the group consisting of tetra-isopropyl titanate, tetra-n-propyl titanate, tetra-n-butyl titanate, ethyl acetoacetate titanium chelate, and titanium triethanol aminato.

Tin can be used as a catalyst instead of titanium or together with titanium. In addition to titanium and tin, the following reaction auxiliaries may be used: for example, magnesium compounds, such as magnesium acetate, magnesium hydroxide, magnesium carbonate, magnesium oxide, magnesium alkoxide, and magnesium hydrogen phosphate; calcium compounds, such as calcium hydroxide, calcium carbonate, calcium oxide, calcium alkoxide, and calcium hydrogen phosphate; antimony compounds, such as antimony trioxide; germanium compounds, such as germanium dioxide and germanium tetraoxide; manganese compounds; zinc compounds; zirconium compounds; cobalt compounds; phosphorus compounds, such as orthophosphoric acid, phosphorous acid, hypophosphorous acid, polyphosphoric acid, esters or metal salts thereof; and sodium hydroxide. In the case where the compound used as a reaction auxiliary overlaps metal organic acid salt B described below, the total amount of metal organic acid salt B and the reaction auxiliary is controlled in the range acceptable for metal organic acid salt B in the present invention.

(Linear Oligomers)

The reason why residues on mold can be reduced during continuous molding in the present invention is considered as described below.

In the polyester resin composition according to the present invention, the amount of linear oligomers of polybutylene terephthalate or the amount of the linear oligomers of polybutylene terephthalate and linear oligomers of polyethylene terephthalate is less than or equal to 1000 mg/kg. Since the polybutylene terephthalate resin accounts for the largest proportion of the polyester resin composition in the present invention, it is preferred to reduce the amount of linear oligomers of polybutylene terephthalate. Since linear oligomers have a lower melting point and a lower glass transition temperature than cyclic oligomers, linear oligomers more easily adhere to a mold than cyclic oligomers. It is believed that linear oligomers adhering to the mold are sticky and play a role like a binder to promote adhesion of cyclic oligomers to the mold. Thus, reducing the amount of linear oligomers in the polyester resin composition very effectively contributes to delaying the start of residues on mold in continuous molding. It is, therefore, very important to reduce the amount of linear oligomers in order to reduce residues on mold.

In the present invention, linear oligomers are thus found to be a basic cause of residues on mold. Since tetrahydrofuran is known to be generated by, for example, the backbiting reaction of terminal hydroxyl groups, the outgas measurement described below reveals that there is a positive correlation between the amount of generated tetrahydrofuran and the degree of residues on mold. Specifically, the degree of residues on mold increases as the amount of generated tetrahydrofuran increases. In the outgas measurement, a 5 mg sample of the polyester resin composition is heated at 265° C. for 10 minutes, and the generated components are analyzed by using GS/MS (trade name: "TD-20/QP-2010 Ultra", available from Shimadzu Corporation) to determine the amount of generated tetrahydrofuran. The detected components can be quantified on, for example, a toluene basis. Residues on mold can be evaluated by performing, for example, the acceleration test described below.

As described above, the linear oligomers contained in the polyester resin composition are ejected to the outside of the resin system in injection molding in the state of being dissolved in tetrahydrofuran generated during molding, and the linear oligomers are thus brought into contact with the mold. At this time, it is considered that tetrahydrofuran, which has a low boiling point, evaporates instead of remaining in the mold, but the linear oligomers dissolved in tetrahydrofuran adhere to the mold without evaporating. Therefore, reducing the amount of generated tetrahydrofuran serving as a medium also leads to reducing distillation of the linear oligomers from the resin system, which results in a small amount of the linear oligomers adhering to the mold and reduced residues on mold.

In the case of a linear oligomer of polybutylene terephthalate, the term linear oligomer as used herein refers to an oligomer with a linear structure including a terephthalic acid-derived structural unit and a 1,4-butanediol-derived structural unit bonded to each other, where the total number of the terephthalic acid-derived structural unit and the 1,4-butanediol-derived structural unit is 2 to 13. In the case of a linear oligomer of polyethylene terephthalate, the term linear oligomer refers to an oligomer with a linear structure including a terephthalic acid-derived structural unit and an ethylene glycol-derived structural unit bonded each other, where the total number of the terephthalic acid-derived structural unit and the ethylene glycol-derived structural unit is 2 to 13. The linear oligomer may have a reactive functional group formed of a hydroxyl group or a carboxyl group at each terminal, and may have carboxyl groups or hydroxyl groups at both terminals. In the case of a cyclic oligomer of polybutylene terephthalate, the term cyclic oligomer refers to an oligomer with a cyclic structure including a terephthalic acid-derived structural unit and a 1,4-butanediol-derived structural unit bonded to each other, where the total number of the terephthalic acid-derived structural unit and the 1,4-butanediol-derived structural unit is 4 to 14. In the case of a cyclic oligomer of polyethylene terephthalate, the term cyclic oligomer refers to an oligomer with a cyclic structure including a terephthalic acid-derived structural unit and an ethylene glycol-derived structural unit bonded each other, where the total number of the terephthalic acid-derived structural unit and the ethylene glycol-derived structural unit is 4 to 14.

As described above, in the polyester resin composition according to the present invention, the amount of linear oligomers of polybutylene terephthalate or the amount of the linear oligomers of polybutylene terephthalate and linear oligomers of polyethylene terephthalate is less than or equal to 1000 mg/kg. The amount of linear oligomers is preferably less than or equal to 950 mg/kg, more preferably less than or equal to 900 mg/kg, still more preferably less than or equal to 800 mg/kg, and yet still more preferably less than or equal to 700 mg/kg. If the amount of linear oligomers is greater than 1000 mg/kg, the effect of reducing residues on mold is insufficient. The lower limit of the amount of linear oligomers is ideally 0 mg/kg. In the case where the polyester resin composition contains both the linear oligomers of polybutylene terephthalate and the linear oligomers of polyethylene terephthalate, the total amount of the linear oligomers is less than or equal to 1000 mg/kg.

The amount of cyclic oligomers is less than or equal to 9000 mg/kg. The amount of cyclic oligomers is preferably less than or equal to 8000 mg/kg, and more preferably 6000 mg/kg. However, if the amount of cyclic oligomers is about 6000 mg/kg but the amount of linear oligomers is greater than 1000 mg/kg, the effect of reducing residues on mold is low. When the amount of linear oligomers is less than or equal to 1000 mg/kg, a lower amount of cyclic oligomers tends to result in a higher effect of reducing residues on mold. From this viewpoint, the amount of cyclic oligomers, which have been believed to be a cause of residues on mold, is relatively flexibly acceptable and can be present up to 9000 mg/kg as long as the amount of linear oligomers is less than or equal to 1000 mg/kg.

The amount of linear oligomers and cyclic oligomers can be determined in the following manner. For example, the polyester resin composition is dissolved in a solvent containing hexafluoroisopropanol/chloroform (volume ratio=2/3), and chloroform, methanol, and the like are added to cause precipitation. Subsequently, the supernatant separated by filtering is dried; the dried supernatant is dissolved in dimethylformamide, followed by filtering. The filtrate is subjected to liquid chromatography analysis to determine the amount of linear oligomers and cyclic oligomers. For example, the amount (quantitative value) of linear oligomers can be calculated on a bishydroxyethyl terephthalate (BHET) basis, and the amount (quantitative value) of cyclic oligomers can be calculated on a polyethylene terephthalate cyclic trimer basis.

The method for controlling the amount of linear oligomers at 1000 mg/kg or less is not limited as long as the amount of linear oligomers can be controlled at 1000 mg/kg or less. Since the polybutylene terephthalate resin accounts for a large proportion of the polyester resin composition in the present invention, reducing the amount of linear oligomers of polybutylene terephthalate is effective.

Examples of the method for controlling the amount of linear oligomers at 1000 mg/kg or less include an adjustment method using a titanium catalyst and a reaction auxiliary, a solid phase polymerization method, and a method including extracting linear oligomers with water or a solvent. The method for controlling the amount of cyclic oligomers at 9000 mg/kg or less is not limited either. Examples of the method include a method including adjusting temperature, time, polymerization catalyst, and the like in polymerization for the polybutylene terephthalate resin, a solid phase polymerization method, a method including a heat treatment in the melted state after polymerization and a method including extracting cyclic oligomers with a predetermined solvent. The amount of both linear oligomers and cyclic oligomers can also be reduced by a combination of these methods and other methods.

For example, in the method of solid phase polymerization for the polybutylene terephthalate resin, the concentration of the terminal carboxyl group and the concentration of the terminal hydroxyl group both tend to decrease as the esterification or transesterification reaction proceeds. Since the molecular weight increases in this method, it is necessary to adjust the intrinsic viscosity (IV) before solid phase polymerization and adjust temperature and time for solid phase polymerization.

In the case where the polyester resin composition contains the polyethylene terephthalate resin, reducing the amount of linear oligomers of polyethylene terephthalate can also contribute to reducing residues on mold. The method for reducing the amount of generated tetrahydrofuran will be described below in detail.

<Metal Organic Acid Salt B>

The polyester resin composition according to the present invention contains metal organic acid salt B, which is either or both of an alkali metal organic acid salt and an alkaline earth metal organic acid salt. The amount of metal organic acid salt B is specified on the basis of the amount of either or both of an alkali metal atom and an alkaline earth metal atom. Specifically, the polyester resin composition contains 0.000005 to 0.05 parts by mass of either or both of an alkali metal atom and an alkaline earth metal atom relative to 100 parts by mass of polyester resin A. In other words, in the present invention, the amount of metal organic acid salt B contained in the polyester resin composition is determined by specifying the amount of either or both of the alkali metal atom and the alkaline earth metal atom.

The reason why the amount of metal organic acid salt B contained in the polyester resin composition is determined by specifying the amount of either or both of the alkali metal atom and the alkaline earth metal atom is as described below. Specifically, since metal organic acid salt B is considered to be present with metal ions dissociated in the polyester resin composition, it is necessary to quantify either or both of metal (ions) and organic acid (ions) in order to know the amount of metal organic acid salt B. However, organic acids volatilize easily and have a structure similar to those of polymers such as polybutylene terephthalate in many cases, and it is thus difficult to quantify organic acids in many cases. Metal atoms (alkali metal atoms and alkaline earth metal atoms) relatively easily remain in the polyester resin composition, and it is thus relatively easy to quantify metal atoms. Therefore, the amount of metal organic acid salt B in the polyester resin composition is determined by specifying the amount of either or both of the alkali metal atom and the alkaline earth metal atom. For this reason, it is apparent that either or both of the alkali metal atom and the alkaline earth metal atom are derived from metal organic acid salt B.

The amount of the alkali metal atom and the alkaline earth metal atom in the polyester resin composition can be determined by ICP optical emission spectrometry.

In other words, the polyester resin composition according to the present invention contains 0.05 mg or greater and 500 mg or less of either or both of an alkali metal atom and an alkaline earth metal atom per kilogram mass of polyester resin A (hereinafter expressed as "mg/kg"). In the case where metal organic acid salt B includes both an alkali metal organic acid salt and an alkaline earth metal organic acid salt, the polyester resin composition contains 0.000005 to 0.05 parts by mass of both an alkali metal atom and an alkaline earth metal atom relative to 100 parts by mass of polyester resin A.

Metal organic acid salt B can reduce the back-biting reaction of the terminal hydroxyl groups of the polybutylene terephthalate resin during molding and can reduce the amount of generated THF. If either or both of the alkali metal atom and the alkaline earth metal atom derived from metal organic acid salt B are present in an amount of less than 0.000005 parts by mass (0.05 mg/kg) relative to 100 parts by mass of polyester resin A, the effect of reducing residues on mold is unlikely to be exerted through the action of metal organic acid salt B. If either or both of the alkali metal atom and the alkaline earth metal atom are present in an amount of greater than 0.05 parts by mass (500 mg/kg) relative to 100 parts by mass of polyester resin A, the decomposition of the polyester resin composition may be accelerated to worsen residues on mold.

The polyester resin composition preferably contains 0.0005 to 0.05 parts by mass of either or both of an alkali metal atom and an alkaline earth metal atom relative to 100 parts by mass of polyester resin A. This numerical value range is more preferably from 0.0005 to 0.04 parts by mass (5 to 400 mg/kg), still more preferably from 0.0006 to 0.03 parts by mass (6 to 300 mg/kg), and yet still more preferably from 0.0007 to 0.02 parts by mass (7 to 200 mg/kg).

From the viewpoint of residues on mold, the metal species of metal organic acid salt B that can be used in the polyester resin composition of the present invention is preferably one or two or more selected from the group consisting of lithium, sodium, potassium, calcium, and magnesium. Among these, lithium, sodium, and potassium are preferred, and potassium is most preferred.

Specific examples of the alkali metal salt or alkaline earth metal salt include salts of these metals with saturated aliphatic carboxylic acids, such as formic acid, acetic acid, propionic acid, butyric acid, and oxalic acid; salts with unsaturated aliphatic carboxylic acids, such as acrylic acid and methacrylic acid; salts with aromatic carboxylic acids; such as benzoic acid; salts with halogen-containing carboxylic acids, such as trichloroacetic acid; salts with hydroxycarboxylic acids, such as lactic acid, citric acid, salicylic acid, and gluconic acid; salts with organic sulfonic acids, such as 1-propanesulfonic acid, 1-pentanesulfonic acid, and naphthalenesulfonic acid; salts with organic sulfuric acids, such as lauryl sulfuric acid; and salts with carbonic acid. Carbonic acid salts are normally taken as inorganic acid salts. In the present invention, the acids having carbon are taken as organic acids, and carbonic acid salts are included in the range of organic acid salts.

From the viewpoint of handleability and the effect of reducing residues on mold, metal organic acid salt B is preferably one or two or more selected from the group consisting of lithium acetate, sodium acetate, potassium acetate, calcium acetate, magnesium acetate, lithium benzoate, sodium benzoate, and potassium benzoate. In particular, metal organic acid salt B is more preferably one or two or more selected from the group consisting of lithium acetate, sodium acetate, potassium acetate, calcium acetate, and magnesium acetate, and still more preferably potassium acetate. These metal organic acid salts B may be used alone or in combination of two or more.

The method for adding metal organic acid salt B to the polyester resin composition is not limited. Examples of the method that can be used include a method for adding metal organic acid salt B to the polybutylene terephthalate resin contained in polyester resin A in the early stage of polymerization (after the esterification reaction or transesterification reaction), a method for adding metal organic acid salt B to the polybutylene terephthalate resin in the late stage of polymerization (during the polycondensation step (depressurization step) or after completion of polymerization), a method for attaching metal organic acid salt B to the pellet surface or impregnating pellets with metal organic acid salt B after pelletization, and a method including previously producing master pellets containing a high concentration of metal organic acid salt B and adding the master pellets during melt kneading for producing the polyester resin composition. Moreover, a method for adding master pellets containing a high concentration of metal organic acid salt B in molding into molded articles may be used. The early stage of polymerization and the late stage of polymerization for the polybutylene terephthalate resin refer to the early stage of polymerization and the late stage of polymerization in what is called melt polymerization for the polybutylene terephthalate resin.

In the case where metal organic acid salt B is added in producing the polybutylene terephthalate resin, a part of the amount of metal organic acid salt B added may be removed to the outside of the reaction system under the reduced pressure. The amount of metal organic acid salt B added thus needs to be determined in consideration of, for example, the reaction apparatus used and the conditions and, as necessary, after the amount of metal organic acid salt B (e.g., either or both of the alkali metal atom and the alkaline earth metal atom) remaining in the polyester resin composition is determined through several trial experiments. Since the same phenomena may occur in vent degassing (decompression) in the production of the polyester resin composition of the present invention through kneading with, for example, a twin screw extruder, the amount of metal organic acid salt B needs to be determined with a necessary measure.

Especially in the case where the polyester resin composition contains 0.0005 to 0.05 parts by mass (5 to 500 mg/kg) of either or both of the alkali metal atom and the alkaline earth metal atom derived from metal organic acid salt B relative to 100 parts by mass of polyester resin A in the present invention, the polyester resin composition is preferably produced by using master pellets containing a high concentration of metal organic acid salt B. The base resin of the master pellets is preferably any one of the resins contained in the polyester resin composition, and more preferably a polybutylene terephthalate resin, which accounts for the largest proportion of the polyester resin composition. The master pellets containing a high concentration of metal organic acid salt B can be produced by mixing the base resin and metal organic acid salt B and melt-kneading the mixture. The melt kneading can be performed by any known method and, for example, a single screw extruder, a twin screw extruder, a pressurizing kneader, or a Banbury mixer can be used. Among these, a twin screw extruder is preferably used.

The amount of metal organic acid salt B in the master pellets is specified on the basis of the amount of either or both of the alkali metal atom and the alkaline earth metal atom. The amount of either or both of the alkali metal atom and the alkaline earth metal atom is preferably 0.02 to 1.5 parts by mass (200 to 15000 mg/kg) relative to 100 parts by mass of the master pellets. If the amount of either or both of the alkali metal atom and the alkaline earth metal atom in the master pellets is greater than 1.5 parts by mass, the base resin may decompose during preparation of the master pellets, and the decomposed base resin may have an adverse effect when the master pellets are added to the polyester resin composition. If the amount of either or both of the alkali metal atom and the alkaline earth metal atom in the master pellets is less than 0.02 parts by mass, the master pellets contain a small amount of metal organic acid salt B, which results in low productivity.

The reason why metal organic acid salt B has an effect of reducing residues on mold is supposed as described below. Specifically, metal organic acid salt B has an effect of stabilizing the ester group and what is called a buffer effect and suppresses the hydrolysis reaction of the polybutylene terephthalate resin and suppresses the back-biting reaction of the terminal hydroxyl groups. This can mainly reduce generation of tetrahydrofuran. Therefore, the polyester resin composition according to the present invention can gain a low-gas property and an effect of significantly reducing residues on mold.

The reason why it is more preferred to add the previously prepared master pellets of metal organic acid salt B in kneading or molding the polyester resin composition than to add metal organic acid salt B during the polyester polymerization step in the method for adding the polyester resin composition to metal organic acid salt B is as described below.

In the case where metal organic acid salt B is added at the timing of the early stage of polymerization (after the esterification reaction or transesterification reaction) of the polybutylene terephthalate resin contained in polyester resin A and the late stage of polymerization (during the polycondensation step (depressurization step) or after completion of polymerization) of the polybutylene terephthalate resin, there is a possibility that terephthalic acid, which is a raw material, may form a salt with the alkali metal or alkaline earth metal in metal organic acid salt B to cause loss of the action of metal organic acid salt B and to reduce the effect of reducing residues on mold. There is also a possibility that the formed salt deposits to form seeds, which results in a failure to obtain a good appearance (especially surface appearance (specularity) showing smoothness), and foreign substances such as the deposited salt become the starting points of material fracture to degrade mechanical properties (in the case where metal organic acid salt B is added after completion of polymerization, it is difficult to uniformly disperse metal organic acid salt B because of a high resin viscosity, and metal organic acid salt B itself may form seeds).

In the case where the previously prepared master pellets of metal organic acid salt B are added in kneading or molding the polyester resin composition, the time during which polyester resin A is in the melted state under the presence of metal organic acid salt B can be shortened, which not only solves the foregoing problem but also reduces decomposition of polyester resin A to suppress deterioration of color tone (increase in yellowish tint).

It is therefore more preferred to add metal organic acid salt B in the form of master pellets in kneading or molding the polyester resin composition than to add metal organic acid salt B in polymerization for the polybutylene terephthalate resin.

The polyester resin composition according to the present invention tends to show a higher Color-b value in the L*a*b* color system and a more yellowish tint when the polyester resin composition contains metal organic acid salt B. From the viewpoint of quality and color variation in coloring, it is preferred to control the Color-b value of the polyester resin composition at 6 or less. Here, the method for adding metal organic acid salt B in the form of master pellets is more preferred than the method for adding metal organic acid salt B in polymerization for the polybutylene terephthalate resin because the former method tends to provide a lower Color-b value. The Color-b value of the polyester resin composition is more preferably less than or equal to 5 and still more preferably less than or equal to 4.

The Color-b value can be determined by using, for example, a commercially available precise spectro-colorimeter in accordance with JIS Z 8722: 2009 and JIS Z 8781-4: 2013 and measuring the specularity of a flat plate (molded by using a mold having a mirror surface) having the mirror surface on one side obtained by injection molding of the polyester resin composition.

<Styrenic Resin C>

The polyester resin composition according to the present invention contains 0.5 to 10 parts by mass of a styrenic resin C relative to 100 parts by mass of polyester resin A. The presence of styrenic resin C in this range can effectively reduce bleed-out of polyester resin-derived oligomer components and release agent D described below.

Styrenic resin C has, for example, effects of reducing bleed-out of the release agent and reducing shrinkage of the polyester resin composition. This may be because styrenic resin C acts in the following manner although the detailed mechanism is unknown.

In the polyester resin composition free of styrenic resin C, low-molecular-weight components, such as the oligomers and the release agent, tend to be present in an amorphous region with a low molecular chain density. In the amorphous region with a low molecular chain density, crystallization (arrangement and density increase of molecular chains) proceeds as a result of heat application. The heat application or the like also increases the molecular mobility of the low-molecular-weight components themselves. The low-molecular-weight components are thus easily removed from the amorphous region and observed as bleed-out when the low-molecular-weight components are removed to the surfaces of molded products.

In the case where styrenic resin C is dispersed in the polyester resin composition, low-molecular-weight components can be present in styrenic resin C, which is not crystallized, the proportion of the low-molecular-weight components removed to the surfaces of molded products may be significantly reduced to reduce bleed-out.

Examples of the amorphous resin that can be expected to have the same action (effect) as styrenic resin C include polycarbonate. However, addition of polycarbonate to the polyester resin composition may adversely affect appearance, for example, may cause whitening of an obtained molded product when the obtained molded product is heated.

If the amount of styrenic resin C is greater than 10 parts by mass, there is a possibility that the phase separation between styrenic resin C and polyester resin A may occur to significantly degrade the surface appearance (specularity) of the molded product. If the amount of styrenic resin C is less than 0.5 parts by mass, there is a possibility that the effect of reducing bleed-out and the effect of reducing shrinkage may not be sufficiently obtained. The amount of styrenic resin C is preferably 1 to 8 parts by mass, and more preferably 2 to 6 parts by mass relative to 100 parts by mass of polyester resin A.

The Mw of styrenic resin C is preferably greater than 50000, and still more preferably less than 600000 from the viewpoint of moldability. If the Mw is less than or equal to 50000, there is a possibility of a low shrinkage reducing effect. If the Mw is greater than or equal to 600000, there is a possibility that the fluidity of the polyester resin composition may be reduced to degrade moldability. The Mw of styrenic resin C is more preferably greater than or equal to 60000, still more preferably greater than or equal to 80000, and yet still more preferably greater than or equal to 100000. The Mw is more preferably less than or equal to 500000, still more preferably less than or equal to 400000, and yet still more preferably less than or equal to 300000.

Styrenic resin C with a Mw in the foregoing region is preferred because styrenic resin C is highly effective in reducing the shrinkage of the polyester resin composition.

Another measure showing the molecular weight of styrenic resin C is a melt volume flow rate (MVR). The MVR of styrenic resin C is preferably 3 to 100 cm$^3$/10 min (measurement conditions: 220° C., 10 kgf). The reason why this range is preferred is the same as that for the Mw. The MVR of styrenic resin C is more preferably 4 to 50 cm$^3$/10 min.

Styrenic resin C is any styrenic resin including a styrenic monomer as a structural unit. Examples of styrenic resin C include a polymer formed by polymerizing a styrenic monomer, a copolymer of a styrenic monomer and a monomer copolymerizable with the styrenic monomer, a graft copolymer formed by polymerizing at least a styrenic monomer under the presence of rubber, and a graft copolymer formed by polymerizing at least a styrenic monomer and a monomer copolymerizable with the styrenic monomer under the presence of rubber.

Examples of the styrenic monomer include styrene, α-methylstyrene and p-methylstyrene, with styrene preferred.

Examples of the monomer copolymerizable with the styrenic monomer include (meth)acrylonitrile and (meth)acrylic acid alkyl esters. In the present invention, the term "(meth)acrylonitrile" refers to "methacrylonitrile" or "acrylonitrile." Similarly, the term "(meth)acrylic acid" refers to "methacrylic acid" or "acrylic acid." Examples of the alkyl groups of (meth) acrylic acid alkyl esters include a methyl group, an ethyl group, and a propyl group.

Examples of the monomer copolymerizable with the styrenic monomer further include maleimide, N-phenylmaleimide, vinyl acetate, vinyl propylate, maleic anhydride, maleic acid monoesters, and maleic acid diesters. In addition, olefins, such as ethylene, propylene, and 1-butene, and dienes, such as butadiene and isoprene, can be used.

Examples of the rubber include diene-based rubber, acryl-based rubber, ethylene/propylene rubber, and silicone rubber. Diene-based rubber and acryl-based rubber are preferred, and rubbers having a glass transition temperature of 10° C. or lower are more preferred.

Styrenic resin C is preferably a styrene-acrylonitrile-based copolymer, which can improve the advantageous effects of the present invention. Specific examples of styrenic resin C include an acrylonitrile-styrene (AS) copolymer, an acrylonitrile-butadiene-styrene (ABS) copolymer, an acrylonitrile-ethylene-styrene (AES) copolymer, and an acrylonitrile-styrene-acrylate (ASA) copolymer, with an AS copolymer preferred. The styrene-acrylonitrile-based copolymer may be modified with a reactive functional group, such as a glycidyl group, a carboxyl group, or an acid anhydride group.

In styrenic resin C, the amount of the styrenic monomer is preferably greater than or equal to 50 mass %, and more preferably greater than or equal to 60 mass %. The upper limit is not particularly limited, but the amount of the styrenic monomer is preferably less than or equal to 80 mass %.

Examples of the method for producing styrenic resin C include known methods, such as an emulsion polymerization method, a solution polymerization method, a suspension polymerization method, and a bulk polymerization method. Among these, the emulsion polymerization method, the solution polymerization method, and the suspension polymerization method are preferred from the viewpoint of low-gas property because the amount of oligomers in the styrenic resin tends to be low.

<Others>

(Release Agent D)

The polyester resin composition of the present invention can contain release agent D in order to improve releasability. To reduce residues on mold, release agent D is preferably a fatty acid ester compound. Examples of the fatty acid ester compound include a compound in which carboxylic acid is partially esterified with monoglycol or polyglycol, and a compound in which carboxylic acid partially forms a metal salt. The amount of release agent D is preferably 0.05 to 3 parts by mass relative to 100 parts by mass of polyester resin A. If the amount of release agent D is less than 0.05 parts by mass, a sufficient mold release effect is not obtained, which may generate, for example, mold release failure or mold release wrinkles. Release agent D itself gasifies or is bled out to cause residues on mold. For example, when a polyester resin composition containing release agent D is used for automotive lamps, the polyester resin composition adheres to a headlight cover or a mirror in an environment at a temperature in the range of 100° C. to 200° C. to generate clouding (fogging). These problems become notable if the amount of release agent D is greater than 3 parts by mass.

(Inorganic Filler)

The polyester resin composition according to the present invention can contain an inorganic filler in order to improve heat resistance and rigidity unless the advantageous effects of the present invention are impaired. The type of inorganic filler is not limited, and a known inorganic filler can be used. The inorganic filler may be subjected to surface treatment in order to improve the compatibility with the polyester resin composition and the dispersibility in the polyester resin composition. The average particle size of the inorganic filler is preferably less than or equal to 3.0 µm in order to provide a preferable surface appearance of molded products of the polyester resin composition. The amount of the inorganic filler is preferably less than 1 part by mass, more preferably less than or equal to 0.8 parts by mass, and still more preferably less than or equal to 0.5 parts by mass relative to 100 parts by mass of polyester resin A. If the amount of the inorganic filler is greater than or equal to 1 part by mass, there may be a failure to meet the demand for a high-quality surface appearance (specularity).

<Method for Producing Polyester Resin Composition>

The polyester resin composition according to the present invention can be produced as follows: mixing the components as described above and additives, such as a stabilizer, added as necessary and melt-kneading the mixture. The melt kneading can be performed by any known method and, for example, a single screw extruder, a twin screw extruder, a pressurizing kneader, or a Banbury mixer was used to perform melt kneading. Among these, a twin screw extruder is preferably used. In the case of using a twin screw extruder, the conditions for normal melt kneading are a cylinder temperature of 230° C. to 270° C. and a kneading time of 2 to 15 minutes.

The method for molding the polyester resin composition according to the present invention is not limited, and the polyester resin composition can be molded by a known method, such as injection molding, extrusion molding, or blow molding. Among these, an injection molding method is preferably used from the viewpoint of universal use.

<Light Reflector Component>

The light reflector component according to the present invention contains the polyester resin composition. The light reflector component can be obtained by molding the polyester resin composition by using a known method, such as an injection molding method, an extrusion molding method, or a blow molding method. The light reflector component is preferably obtained by using an injection molding method from the viewpoint of universal use. The light reflector component functions as a light reflector described below when the light reflector component includes, for example, a light reflecting metal layer.

<Light Reflector>

The light reflector according to the present invention includes the light reflector component having a light reflecting metal layer on at least part of the surface of the light reflector component. For example, the light reflector can be obtained by directly forming a metal thin film (e.g., aluminum foil), which serves as a light reflecting metal layer, on at least part of the surface of the light reflector component. In particular, the light reflector is preferably obtained by metallization of a metal thin film on at least part of the surface of the light reflector component. The metallization can be performed, but not limited to, by any known method.

The light reflector according to the present invention can be used in, for example, automotive lamps (e.g., headlights), light reflectors (e.g., extensions, reflectors, or housings), and various components, such as light fixtures, electrical components, electronic components, and household goods.

EXAMPLES

The present invention will be described below in more detail by way of Examples, but the present invention is not limited to these Examples. The measured values described in Examples are values measured by the following methods.

(1) Intrinsic viscosity (IV): The intrinsic viscosity (IV) of a polybutylene terephthalate resin a and a polyethylene terephthalate resin b was measured at 30° C. with an Ubbelohde viscometer by using a solvent mixture of phenol/tetrachloroethane (mass ratio: 1/1). The flow time (seconds) of a 0.4 g/dl solution of polybutylene terephthalate resin a, the flow time (seconds) of a 0.4 g/dl solution of polyethylene terephthalate resin b, and the flow time (seconds) of only the solvent mixture were measured at 30° C., and the intrinsic viscosity (IV) was determined from the formula (I) described above.

(2) Terminal carboxyl group concentration (unit: eq/ton, expressed as an acid value): Polybutylene terephthalate resin a (0.5 g) was dissolved in 25 ml of benzyl alcohol, and the obtained solution was titrated with a 0.01 mol/l solution of sodium hydroxide in benzyl alcohol. The indicator used was a solution of 0.10 g of phenolphthalein in a mixture of 50 ml of ethanol and 50 ml of water. The terminal carboxyl group concentration of polyethylene terephthalate resin b was also quantitatively determined in the same manner.

(3) Terminal hydroxyl group concentration (unit: eq/ton): The terminal hydroxyl group concentration of polybutylene terephthalate resin a was quantitatively determined by $^1$H-NMR spectroscopy at a resonance frequency of 500 MHz. The measurement apparatus was an NMR apparatus (trade name: "AVANCE-500", available from Bruker Corporation).

First, 10 mg of polybutylene terephthalate resin a or 10 mg of polyethylene terephthalate resin b was dissolved in 0.12 ml of a solvent containing deuterated chloroform/hexafluoroisopropanol (volume ratio=1/1). To the solution, 0.48 ml of deuterated chloroform and 5 µl of pyridine-d5 were then added and stirred well to prepare a resin solution. Subsequently, the resin solution was charged into an NMR tube and subjected to $^1$H-NMR spectroscopy. Deuterated chloroform was used as a lock solvent, and the number of scans was 128.

Next, in the measured $^1$H-NMR spectrum, the peak (i) of terephthalic acid from polybutylene terephthalate or polyethylene terephthalate appears at 8.10 ppm when the peak of chloroform appears at 7.29 ppm. For polybutylene terephthalate resin a, the peak (ii) of 1,4-butanediol at the terminal appears at 3.79 ppm. For polyethylene terephthalate resin b, the peak (iii) of ethylene glycol at the terminal appears at 4.03 ppm. The terminal hydroxyl group concentration was obtained from the following formulas where (i) to (iii) were the integrated values of the respective peaks.

For polybutylene terephthalate resin a: {(ii)×1000000/2}/{(i)×220/4}=terminal hydroxyl group concentration (eq/ton)

For polyethylene terephthalate resin b: {(iii)×1000000/2}/{(i)×192/4}=terminal hydroxyl group concentration (eq/ton)

(4) Titanium atom content, Potassium atom content, Magnesium atom content: The polyester resin composition was wet-decomposed with high-purity sulfuric acid for electronics industry and high-purity nitric acid for electronics industry and subjected to emission spectrometry using ICP (trade name: "SPECTROBLUE", AMETEK, Inc.).

(5) Oligomer content: The polyester resin composition (0.1 g) was dissolved in 3 ml of a solvent containing hexafluoroisopropanol/chloroform (volume ratio=2/3), and 20 ml of chloroform and 10 ml of methanol were then added to the solution to precipitate the polymer. Subsequently, the supernatant separated by filtering was dried, the dried supernatant was dissolved in 10 ml of dimethylformamide and filtered, and the filtrate was subjected to quantitative determination of each oligomer component by using liquid chromatography analysis. The quantitative values of linear oligomers were calculated on a bishydroxyethyl terephthalate (BHET) basis, and the quantitative values of cyclic oligomers were calculated on a polyethylene terephthalate cyclic trimer basis, by using the respective calibration curves. The measurements were performed under the following conditions.

Liquid chromatography system: "Prominence", available from Shimadzu Corporation

Column: Shim-pack XR-ODS 2.2 µm (3×100 mm)

Mobile phase: A 0.2% acetic-acid water, B acetonitrile

Gradient: 0 min (10% B), 25 min (100% B), 27 min (100% B), 27.01 min (10% B), 32 min (10% B)

Flow rate: 1.1 ml/min

Column temperature: 50° C.

Injection volume: 5 µl

Detection wavelength: UV 258 nm.

(6) Color-b value (flat plate): A flat plate molded product, 100 mm×100 mm×2 mm, formed of the polyester resin composition was obtained by injection molding using an injection molding machine (trade name: "EC100N" available from Toshiba Machine Co., Ltd.) and a mold having a mirror surface polished with a #6000 file. This flat plate molded product has, on one side, the mirror surface transferred from the mold. The cylinder temperature during molding was 260° C., and the mold temperature was 60° C. The Color-b value on the mirror surface side of the flat plate molded product was determined by using a precise spectrophotometric colorimeter (trade name: "TC-1500SX", available from Tokyo Denshoku Co., Ltd.) in accordance with JIS Z 8722: 2009 and JIS Z 8781-4: 2013. The measurement conditions were a D65 light source, a 10°-visual field, and a 0°-d method.

(7) Residues on mold acceleration test: An injection molding machine (trade name: "EC100N" available from Toshiba Machine Co., Ltd.) was provided, and a continuous-molding evaluation mold (having a cavity with an outer diameter of 30 mm, an inner diameter of 20 mm, and a thickness of 3 mm, and having, at the flow end, a recess without a gas vent) was provided as a mold. By using this mold, the polyester resin composition was continuously molded by a short shot method in order to facilitate accumulation of residues on mold accelerating components, such as outgases and oligomers, in the recess on the opposite side of the gate section, and the degree of residues on mold was observed. The cylinder temperature during molding was 260° C., the mold temperature was 50° C., and the cycle time of molding was 40 seconds. The residues on mold after 20 shots was evaluated. The residues on mold was captured with a digital camera and visually evaluated on the basis of the following criteria by using the gray-scaled image in order to make image colors uniform.

A: Residues are not observed.
B: Residues are hardly observed.
C: Residues are vaguely observed at the center in the vicinity of the recessed part on the opposite side of the gate part.
D: Residues are black and noticeable with a clear contour at the center in the vicinity of the recessed part on the opposite side of the gate part.

(8) Thermal deformation temperature (load: 0.45 MPa): A multipurpose test specimen defined in ISO-3167 was molded by using an injection molding machine (trade name: "EC100N" available from Toshiba Machine Co., Ltd.) under the conditions of a cylinder temperature of 260° C. and a mold temperature of 60° C. The thermal deformation temperature of the multipurpose test specimen was determined under a load of 0.45 MPa in accordance with ISO-75.

(9) Bleed-out property (visual observation): A flat plate molded product, 100 mm×100 mm×2 mm, formed of the polyester resin composition was obtained by injection molding using an injection molding machine (trade name: "EC100N" available from Toshiba Machine Co., Ltd.) and a mold having a mirror surface polished with a #14000 file. This flat plate molded product has, on one side, the mirror surface transferred from the mold. The cylinder temperature during molding was 260° C., the mold temperature was 60° C., and the cycle time was 40 seconds.

The molded product was placed in a gear oven at 160° C. After 24 hours elapsed, the presence of bleed-out was visually checked under the sun outdoors. The presence of bleed-out was evaluated on the basis of the following criteria compared with a flat plate molded product before heat treatment. When bleed-out occurred, a rainbow pattern or the like was observed on the surface of the molded product.

A: No bleed-out is observed.
B: Bleed-out is (sparsely) observed only on part of the surface.
C: Bleed-out is observed on the entire surface of the molded product.

(10) Metallization heat resistance test (diffuse reflectance): A flat plate molded product, 100 mm×100 mm×2 mm, formed of the polyester resin composition was obtained by injection molding using an injection molding machine (trade name: "EC100N" available from Toshiba Machine Co., Ltd.) and a mold having a mirror surface polished with a #14000 file. This flat plate molded product has, on one side, the mirror surface transferred from the mold. The cylinder temperature during molding was 260° C., the mold temperature was 60° C., and the cycle time was 40 seconds.

Next, the molded product was placed in a vacuum evaporator, and the pressure of the vacuum evaporator was reduced to about $1 \times 10^{-5}$ Pa. Subsequently, a tungsten resistance heating element was electrically heated to evaporate aluminum, which was used as an evaporation source, under a high temperature (for 2 minutes). The evaporated aluminum particles were deposited on the surface of the molded product, whereby an aluminum metallized film was formed on the entire surface of the molded product. The thickness of the aluminum metallized film was 80 nm.

The molded product with metallized aluminum was placed in a gear oven at 160° C. After 24 hours elapsed, the diffuse reflectance was measured with a haze & reflectance meter HR-100 available from Murakami Color Research Laboratory Co., Ltd. When the diffuse reflectance after heat treatment is less than or equal to 2%, the molded product can be used without any practical problem. If the diffuse reflectance is greater than 2%, there may be some practical problem due to a poor appearance.

The components used in Examples and Comparative Examples will be described next.

Polyester resin A is any one of the following polybutylene terephthalate resins a or composed of polyethylene terephthalate resin b and any one of the following polybutylene terephthalate resins a.

Any one of the following resins was used as polybutylene terephthalate resin a.

a-1: IV=0.83 dl/g, terminal hydroxyl group=95 eq/ton, acid value=9 eq/ton, titanium atom content=80 mg/kg (using a melt polymerization resin with IV=0.78 dl/g, and obtained by solid phase polymerization to reach IV=0.83 dl/g at 210° C.). Note that 10 mg/kg of potassium acetate was added as metal organic acid salt B in the melt polymerization (after the esterification reaction) for the melt polymerization resin.

a-2: IV=0.83 dl/g, terminal hydroxyl group=95 eq/ton, acid value=9 eq/ton, titanium atom content=30 mg/kg (using a melt polymerization resin with IV=0.78 dl/g, and obtained by solid phase polymerization to reach IV=0.83 dl/g at 210° C.). Note that no metal organic acid salt B was added.

a-3: IV=0.83 dl/g, terminal hydroxyl group=95 eq/ton, acid value=9 eq/ton, titanium atom content=80 mg/kg (using a melt polymerization resin with IV=0.78 dl/g, and obtained by solid phase polymerization to reach IV=0.83 dl/g at 210° C.). Note that metal organic acid salt B was added in the form of master pellets during melt kneading.

a-4: IV=0.83 dl/g (resin obtained by melt polymerization), terminal hydroxyl group=100 eq/ton, acid value=10 eq/ton, titanium atom content=80 mg/kg (no particular treatment was performed in order to reduce the amount of linear oligomers). Note that metal organic acid salt B was added in the form of master pellets during melt kneading.

a-5: IV=0.83 dl/g, terminal hydroxyl group=95 eq/ton, acid value=9 eq/ton, titanium atom content=30 mg/kg (using a melt polymerization resin with IV=0.78 dl/g, and obtained by solid phase polymerization to reach IV=0.83 dl/g at 210° C.). Note that metal organic acid salt B was added in the form of master pellets during melt kneading.

The foregoing amount of metal organic acid salt B composed of potassium acetate was added to a polybutylene terephthalate resin a-1 during polymerization. The residual amount (content) of metal organic acid salt B in the polyester resin composition was shown in Tables 1 and 2 below. Metal organic acid salt B composed of potassium acetate or magnesium acetate in the form of master pellets prepared in advance was added in the amount shown in Tables 1 and 2 below to polybutylene terephthalate resins a-3 to a-5 during melt kneading for forming the polyester resin composition. A polybutylene terephthalate resin a-2 was free of metal organic acid salt B.

Polyethylene terephthalate resin b: IV=0.62 dl/g, acid value=30 eq/ton.

The following compounds were used as metal organic acid salt B.

B-1: Potassium acetate (available from Wako Pure Chemical Industries, Ltd.)

B-2: Master pellets of potassium acetate (available from Wako Pure Chemical Industries, Ltd.)

B-3: Master pellets of magnesium acetate (available from Wako Pure Chemical Industries, Ltd.)

The base resin for the master pellets was the same resin as the polybutylene terephthalate resin present in the polyester resin composition to which the master pellets were to be added. The amount of metal organic acid salt B in the master pellets was 0.2 parts by mass in terms of the potassium atom of B-2 relative to 100 parts by mass of the master pellets, and 0.085 parts by mass in terms of the magnesium atom of B-3 relative to 100 parts by mass of the master pellets.

The following compounds were used as styrenic resin C.

C-1: Acrylonitrile-styrene copolymer (suspension polymerization product) [trade name: "AP-20", available from UMG-ABS Inc. (MVR=38 cm$^3$/10 min; measurement conditions 220° C., 10 kgf), Mw=130000, styrene component content 70 to 75 mass %]

C-2: Acrylonitrile-styrene copolymer (suspension polymerization product) [trade name: "AP-50", available from UMG-ABS Inc. (MVR=8.5 cm$^3$/10 min; measurement conditions 220° C., 10 kgf), Mw=220000, styrene component content 70 to 75 mass %]

The Mw was determined by gel permeation chromatography under the following conditions.

Gel permeation chromatography system: trade name: "HLC-8220", available from Tosoh Corporation Column: TSKgel SuperHZM-H two columns, TSKgel SuperHZ2000 (Tosoh Corporation) one column Guard column: TSKgel guardcolumn SuperHZ-H
Eluent: Tetrahydrofuran
Flow rate: 0.35 ml/min
Sample-dissolving solvent: Tetrahydrofuran
Concentration of dissolved sample: 0.05 mass %
Injection volume: 10 μl
Detector: Refractive index detector (RI)
Temperature: 40° C.
Standard sample: Standard sample Polystyrene Standards (available from Tosoh Corporation).

The following compound was used as release agent D.

D-1: Triglycerol behenic acid full ester (trade name: "Poem TR-FB", available from Riken Vitamin Co., Ltd.)

An antioxidant (trade name: "IRGANOX 1010", available from BASF SE) was used as a stabilizer. This stabilizer was added in an amount of 0.2 parts by mass relative to 100 parts by mass of polyester resin A.

Examples 1 to 9, Comparative Examples 1 to 5

The components mixed in the combinations shown in Tables 1 and 2 were kneaded with a same-direction twin screw extruder having a cylinder temperature set at 250° C. The resultant strands were cooled with water and pelletized. The resultant pellets were dried at 130° C. for 4 hours to provide polyester resin compositions corresponding to Examples and Comparative Examples. These polyester resin compositions were subjected to the evaluation tests (4) to (10) described above.

Regarding the amount of metal organic acid salt B, the residual amount (content) of metal organic acid salt B in the polyester resin composition after melt kneading was smaller than the amount of metal organic acid salt B added in Examples where metal organic acid salt B was added during polymerization (this may be because metal organic acid salt B is distilled off in the depressurization step in the late stage of polymerization and in the vent degassing step during melt kneading. In Comparative Example 1 (the case of using polybutylene terephthalate resin a-2), no metal organic acid salt B was added. These results are described in Tables 1 and 2 below.

TABLE 1

| | Type | Unit | | Example 1 | Example 2 | Comparative Example 1 | Comparative Example 2 | Comparative Example 3 |
|---|---|---|---|---|---|---|---|---|
| Composition | Polyester resin (A) | parts by mass | a-1 | 100 | — | — | — | — |
| | | | a-2 | — | — | 100 | — | — |
| | | | a-3 | — | 100 | — | — | 100 |
| | | | a-4 | — | — | — | 100 | — |
| | Metal organic acid salt (B) *$^1$ | parts by mass | B-1 | 0.0002 | — | — | — | — |
| | | | B-2 | — | 0.001 | — | 0.001 | 0.001 |
| | Styrenic resin (C) | parts by mass | C-1 | 3 | 3 | 3 | 3 | — |
| | Release agent (D) | parts by mass | D-1 | 0.3 | 0.3 | 0.3 | 0.3 | 0.3 |
| Physical properties of composition | Titanium atom content | mg/kg | — | 80 | 80 | 30 | 80 | 80 |
| | Linear oligomer content | mg/kg | — | 950 | 950 | 950 | 1200 | 950 |
| Properties of molded product | Color-b | — | — | 1.8 | 1.8 | 1.6 | 1.8 | 1.8 |
| | Residues on mold | — | — | B | B | D | D | B |
| | Bleed-out (visual observation) | — | — | B | B | B | B | C |
| | Diffuse reflectance | % | — | 1.9 | 1.9 | 1.9 | 2.2 | 2.6 |

*$^1$ The parts by mass of metal organic acid salt (B) indicate the parts by mass of a metal atom (potassium or magnesium) remaining in the polyester resin composition.

TABLE 2

| | Type | Unit | | Example 3 | Example 4 | Example 5 | Example 6 | Example 7 | Example 8 | Example 9 | Comparative Example 4 | Comparative Example 5 |
|---|---|---|---|---|---|---|---|---|---|---|---|---|
| Composition | Polyester resin (A) | parts by mass | a-5 | 100 | 100 | 100 | 100 | 100 | 100 | 90 | 100 | 100 |
| | | | b | — | — | — | — | — | — | 10 | — | — |
| | Metal organic acid salt (B) *1 | parts by mass | B-2 | 0.001 | 0.001 | 0.001 | 0.001 | 0.005 | — | 0.001 | 0.07 | 0.001 |
| | | | B-3 | — | — | — | — | — | 0.001 | — | — | — |
| | Styrenic resin (C) | parts by mass | C-1 | 3 | 1 | 6 | — | 3 | 3 | 3 | 3 | 15 |
| | | | C-2 | — | — | — | 3 | — | — | — | — | — |
| | Release agent (D) | parts by mass | D-1 | 0.3 | 0.3 | 0.3 | 0.3 | 0.3 | 0.3 | 0.3 | 0.3 | 0.3 |
| Physical properties of composition | Titanium atom content | mg/kg | — | 30 | 30 | 30 | 30 | 30 | 27 | 30 | 30 | 30 |
| | Linear oligomer content | mg/kg | — | 950 | 950 | 950 | 950 | 950 | 950 | 950 | 950 | 950 |
| Properties of molded product | Color-b | — | — | 2.0 | 2.0 | 2.0 | 2.0 | 2.6 | 2.0 | 2.0 | 5.3 | — |
| | Residues on mold | — | — | B | B | B | B | A | B | B | B | B |
| | Bleed-out (visual observation) | — | — | B | B | A | B | B | B | B | B | — |
| | Diffuse reflectance | % | — | 1.9 | 2.2 | 1.7 | 1.9 | 1.9 | 1.9 | 1.8 | 1.9 | — |

*1 The parts by mass of metal organic acid salt (B) indicate the parts by mass of a metal atom (potassium or magnesium remaining in the polyester resin composition.

Tables 1 and 2 indicate that the polyester resin compositions of Examples 1 to 9 have good properties because they cause very low residues on mold in continuous molding. The polyester resin compositions of Examples 1 to 9 further have a favorable bleed-out property (have no bleed-out) and provide a good appearance after heat treatment.

Comparative Examples 1 to 5 correspond to at least any one of an example where no metal organic acid salt B is added, an example where the amount of linear oligomers is over the specified range, an example where no styrenic resin C is added, an example where metal organic acid salt B is added in an excess amount, and an example where styrenic resin C is added in an excess amount. Comparative Examples 1 to 5 were more likely to cause residues on mold and provide an unfavorable bleed-out property than Examples.

As the thermal deformation temperature was compared between Example 3 and Example 9, which have different proportions of polyethylene terephthalate resin b, the thermal deformation temperature was 145° C. in Example 3 and 121° C. in Example 9. It is found that the presence of the polyethylene terephthalate resin b tends to lower the thermal deformation temperature, but the heat resistance of each of Example 3 and Example 9 is evaluated to be acceptable.

The embodiments and Examples of the present invention are described above, but it is also presumed from the beginning that the features of the embodiments and Examples can be combined appropriately.

The embodiments disclosed herein are for illustrative purposes in any respect and should not be construed as limiting. The scope of the present invention is defined by the scope of the claims rather than the description of the embodiments and is intended to include any modifications within the scope and meaning equivalent to the claims.

The invention claimed is:

1. A polyester resin composition comprising:
a polyester resin A containing 70 to 100 mass % of a polybutylene terephthalate resin and 0 to 30 mass % of a polyethylene terephthalate resin,
wherein
the polyester resin composition further comprises a metal organic acid salt B, which is either or both of an alkali metal organic acid salt and an alkaline earth metal organic acid salt, and 0.5 to 10 parts by mass of a styrenic resin C relative to 100 parts by mass of the polyester resin A,
the polyester resin composition comprises 0.000005 to 0.05 parts by mass of either or both of an alkali metal atom and an alkaline earth metal atom relative to 100 parts by mass of the polyester resin A, and
in the polyester resin composition, an amount of linear oligomers of polybutylene terephthalate or an amount of the linear oligomers of polybutylene terephthalate and linear oligomers of polyethylene terephthalate is less than or equal to 1000 mg/kg.

2. The polyester resin composition according to claim 1, wherein the polyester resin composition comprises a titanium atom in an amount less than or equal to 50 mg/kg.

3. The polyester resin composition according to claim 1, wherein the polyester resin composition comprises 0.0005 to 0.05 parts by mass of either or both of the alkali metal atom and the alkaline earth metal atom relative to 100 parts by mass of the polyester resin A.

4. The polyester resin composition according to claim 1, wherein the metal organic acid salt B has one or two or more metal species selected from the group consisting of lithium, sodium, potassium, calcium, and magnesium.

5. The polyester resin composition according to claim 1, wherein the metal organic acid salt B is one or two or more selected from the group consisting of lithium acetate, sodium acetate, potassium acetate, calcium acetate, magnesium acetate, lithium benzoate, sodium benzoate, and potassium benzoate.

6. The polyester resin composition according to claim 1, wherein the styrenic resin C is a styrene-acrylonitrile-based copolymer.

7. A light reflector component comprising the polyester resin composition according to claim 1.

8. A light reflector comprising the light reflector component according to claim 7, wherein the light reflector component has a light reflecting metal layer on at least part of a surface of the light reflector component.

\* \* \* \* \*